United States Patent
Sharp (10) Patent No.: US 11,573,360 B2
(45) Date of Patent: Feb. 7, 2023

(54) POLARIZATION COMPENSATOR FOR TILTED SURFACES

(71) Applicant: META PLATFORMS TECHNOLOGIES, LLC, Menlo Park, CA (US)

(72) Inventor: Gary D. Sharp, Boulder, CO (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 56 days.

(21) Appl. No.: 16/846,843

(22) Filed: Apr. 13, 2020

(65) Prior Publication Data

US 2020/0379155 A1  Dec. 3, 2020

Related U.S. Application Data

(60) Provisional application No. 62/832,824, filed on Apr. 11, 2019.

(51) Int. Cl.
| | |
|---|---|
| *G02B 5/30* | (2006.01) |
| *G02F 1/00* | (2006.01) |
| *G02F 1/13363* | (2006.01) |
| *G02F 1/1337* | (2006.01) |

(52) U.S. Cl.
CPC ........ *G02B 5/3066* (2013.01); *G02F 1/0063* (2013.01); *G02F 1/133633* (2021.01); *G02F 1/133742* (2021.01); *G02F 2202/04* (2013.01)

(58) Field of Classification Search
CPC ............ G02F 1/133638; G02F 1/0063; G02F 1/13363; G02F 1/133631; G02F 1/133632; G02F 1/133633; G02F 1/133634; G02F 1/133635; G02F 1/133636; G02F 1/133637; G02F 2413/00; G02F 2413/01; G02F 2413/02; G02F 2413/03; G02F 2413/04; G02F 2413/05; G02F 2413/06; G02F 2413/07; G02F 2413/08; G02F 2413/10; G02F 2413/105; G02F 2413/12; G02F 2413/13; G02F 2413/14; G02B 5/3016

See application file for complete search history.

(56) References Cited

FOREIGN PATENT DOCUMENTS

JP  2018022153 A  *  2/2018

* cited by examiner

*Primary Examiner* — Jessica M Merlin
(74) *Attorney, Agent, or Firm* — Greenberg Traurig, LLP (57) ABSTRACT

In polarization-based optical systems, preserving a state-of-polarization (SOP) over a prescribed range of incidence angles and wavelengths may be necessary. Optical materials with local normal tilted with respect to an incident ray can introduce an undesirable polarization nonuniformity that can be substantially corrected using a compensator as disclosed herein. The compensator may include a uniaxial retarder and a z-partial polarizer (ZPP). The ZPP may include a uniaxial material with an absorption axis normal to the substrate.

27 Claims, 11 Drawing Sheets

POLARIZATION COMPENSATOR FOR TILTED SURFACES

CROSS-REFERENCE

This application claims priority to U.S. Provisional Application No. 62/832,824 filed Apr. 11, 2019, the contents of which are incorporated herein by reference in its entirety.

BACKGROUND

Certain optical systems require precisely controlling the state-of-polarization (SOP) when encountering one or more reflecting or absorbing surfaces contained between the input and output. These surfaces can create a polarization non-uniformity that depends upon ray position and/or orientation in the system. For instance, a plane-wave normally incident on a convex lens may preserve the SOP on axis, but may show an increase in polarization distortion with ray displacement from the axis. A similar result may occur with a point-source incident on a plano surface. In the case of an uncoated isotropic dielectric (e.g. glass), the Fresnel equations give the transmission/reflection of light polarized parallel (P) and perpendicular (S) to the plane of incidence (POI). The angle-of-incidence (AOI) is that between the ray direction and the local surface normal. At zero AOI, the SOP may be preserved, but the extent of polarization distortion typically grows with AOI, affecting the quality of the output. In some instances, such as direct-view/projection liquid crystal displays, direct-view/projection organic light emitting diode displays, broad-band polarization-based isolators, and polarization-based triple-pass wide-angle collimating lenses (i.e. pancake-lenses), accurate polarization control over angle (and often wavelength) may determine factors such as dynamic-range and contrast. Minute polarization distortions can, in some instances, cause display contrast ratio to plummet when not precisely controlled.

It is against this background that the techniques described herein have been developed.

SUMMARY

Disclosed herein is an optical component comprising an anisotropic material with an optic-axis substantially normal to the substrate, a thickness-direction retardation ($R_{th}$), and a thickness-direction absorption.

The absorption of light at normal incidence may be <5% or <2%. The transmission of p-polarized light may be less than the transmission of s-polarized light and the compensator may produce a phase-difference between transmitted p-polarized light and transmitted s-polarized light. The transmission of p-polarized light may decline according to the exponential decay function, $I=I_0 e^{-\kappa d \sin^2\theta}$. The compensator extinction-coefficient and thickness are selected to produce a specific non-zero transmission of p-polarized light at a prescribed angle-of-incidence.

The optical component may further include a non-absorbing anisotropic material with an optic-axis normal to the substrate and a second thickness-direction retardation, wherein the combined angle-dependent absorption and $R_{th}$ can be selected independently. The compensator may include a cross-linked reactive mesogen. The compensator may include a homeotropically aligned liquid crystal. The compensator may include a guest-host liquid-crystal with an oriented absorbing dye. The compensator may include an oriented nano-structure.

Also disclosed is a compensator for use in a polarization-preserving optical-system, comprising an anisotropic material with an optic-axis substantially normal to the substrate, a thickness-direction retardation ($R_{th}$), and a thickness-direction absorption, wherein the addition of the compensator substantially increases system contrast or uniformity of a polarization pupil map.

The absorption of light at normal incidence may be <5% or <2%. The transmission of p-polarized light may be less than the transmission of s-polarized light and wherein the compensator produces a phase-difference between transmitted p-polarized light and transmitted s-polarized light. The transmission of p-polarized light declines according to the exponential decay function, $I=I_0 e^{-\kappa d \sin^2\theta}$. The compensator extinction-coefficient and thickness may be selected to produce a specific non-zero transmission of p-polarized light at a prescribed angle-of-incidence. The compensator may further include a non-absorbing anisotropic material with an optic-axis normal to the substrate and a second thickness-direction retardation, wherein the combined angle-dependent absorption and $R_{th}$ can be selected independently. The compensator may include a cross-linked reactive mesogen. The compensator may include a homeotropically aligned liquid crystal. The compensator may include a guest-host liquid-crystal with an oriented absorbing dye. The compensator may include an oriented nano-structure.

Also disclosed is an optical system comprising an input polarized light, a lens that produces diattenuation in transmission, and a Z-Partial-Polarizer (ZPP), wherein the ZPP transmits p-polarized light less than s-polarized light in a manner that substantially reduces the polarization distortion produced by diattenuation.

For a prescribed incidence-angle, the system may transmit p-polarized light and s-polarized light equivalently. The prescribed incidence-angle may be between 30° and 60°. The ZPP may be located in a position of either a converging or diverging cone of light. The system may further include a functional coating with a thickness-direction retardation ($R_{th}$) and a C-plate co-located with the ZPP that substantially reduces the net $R_{th}$. The system may further include a functional coating with a thickness-direction retardation ($R_{th}$) and a ZPP with a thickness-direction retardation such that the net thickness direction retardation is substantially reduced.

Also disclosed in an optical system comprising an input polarizer, an analyzing polarizer, and a functional layer between the polarizers, such that the surface of the functional layer is tilted with respect to at least one ray of incident light, and a Z-Partial-Polarizer (ZPP).

The functional layer may produce diattenuation for the at least one ray, and the ZPP may substantially compensate for the diattenuation by attenuating p-polarized light more than s-polarized light. The functional layer may further produce thickness-direction retardation, and the ZPP may further produce a thickness-direction retardation, such that the net thickness-direction retardation of the system is substantially reduced. The functional layer may be a partial-reflector that produces a thickness-direction retardation, and the system may further include a C-plate co-located with the ZPP such that the net thickness-direction retardation of the system is substantially reduced.

The system may further include a polarization-based triple-pass lens and the functional layer comprises a compound-curved partial-reflector. The functional layer may be a partial-reflector that produces a thickness-direction retardation, and the ZPP may produce a thickness-direction retardation such that the net thickness-direction retardation of the system is substantially reduced. The functional layer may be a partial-reflector that produces a thickness-direction retardation, and the system may further include a C-plate co-located with the ZPP such that the net thickness-direction retardation of the system is substantially reduced.

DETAILED DESCRIPTION

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Described are polarization compensators for use with surfaces that are tilted relative to incident light that make it feasible to preserve the SOP over a range of ray angles and/or ray positions in an optical system. The compensators can be used in optical systems containing multiple plano surfaces that accommodate a wide range of incidence angles (e.g. converging or diverging light). The compensators can also be used in optical systems that are substantially collimated but contain non-plano surfaces, such as refracting elements. The system may contain elements of each, such as low f-number polarization-preserving optical systems that contain high-power refracting elements. The disclosed techniques may also be used in combination with diffractive optical components, such as geometric-phase lenses, which have circular eigen-polarizations. The surfaces may be uncoated dielectrics, multi-layer dielectrics (e.g. reflectors or partial reflectors), absorbing layers (e.g. metals or semiconductors), or hybrids of these. The one or more tilted surfaces may produce a distortion in phase-difference, amplitude-difference, or both, that is compensated using the described structures.

Figure 1:
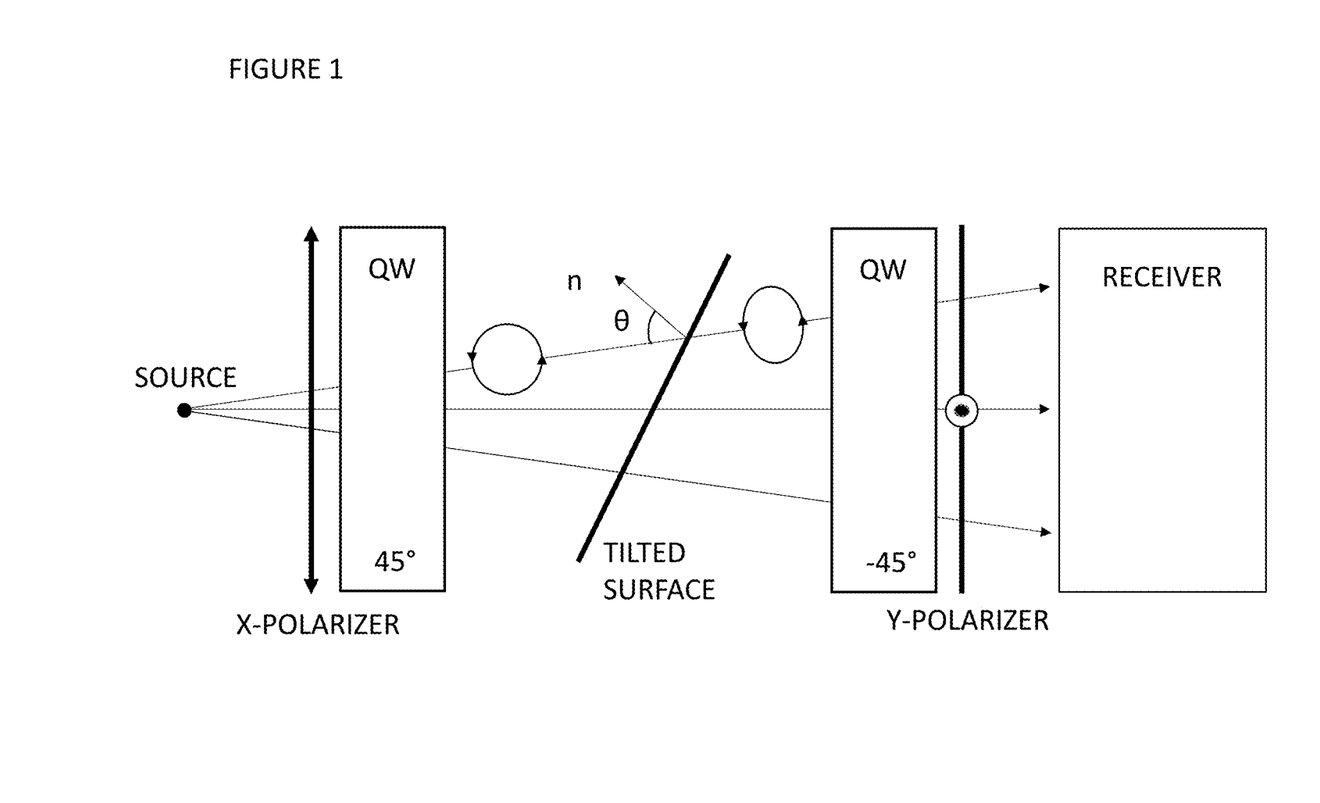
FIG. 1 shows an exemplary optical system for demonstrating the effect of a tilted surface on the SOP.

FIG. 1 shows an example of a transmissive optical system that demonstrates the problem. A (e.g.) point light source producing an angular distribution of ray angles (and likely a distribution of wavelengths) is incident on an ideal circular polarizer. That is, the ellipticity of the SOP exiting the CP for each ray and wavelength is unity, where the ellipticity is defined here as the magnitude of the ellipse field-ratio, with the larger of the components in the denominator. Note that this requires zero reflection at the exit face of the first CP and the entrance of the second in order to preserve polarization. At the output is the ideal orthogonal circular polarization analyzer, followed by an optical receiver that collects light from the source over a range of angles. The latter may be the eye, a square-law detector, a digital camera, or additional (e.g. relay) optics. In this exemplary case, the circular polarizers generate/analyze the SOP perfectly, such that no light exits the system, and no optical power is incident on the receiver. This may be regarded an optical system with infinite contrast. The output can also be expressed as a Jones vector that resolves the SOP parallel/perpendicular to a linear analyzing polarizer. In the air space between the circular polarizers, elements can be inserted that demonstrate the change in ellipticity from a tilted surface and the resulting impact on contrast.

In a cartesian coordinate system containing the local POI, the vector for the transmission resolved along the exit polarizer can be given by $$\begin{pmatrix} t_p \\ t_s \end{pmatrix} = \frac{1}{\sqrt{2}} \begin{pmatrix} 1 & -i \\ -i & 1 \end{pmatrix} \begin{pmatrix} \sqrt{T_p}\, e^{i\phi_p} & 0 \\ 0 & \sqrt{T_s}\, e^{i\phi_s} \end{pmatrix} \frac{1}{\sqrt{2}} \begin{pmatrix} 1 \\ i \end{pmatrix}$$

which is the product of the input circular vector, the Jones matrix for the tilted surface, and the Jones matrix for the analyzing quarter-wave retarder. The tilted surface can be one or more interfaces (e.g. a multi-layer coating) with a common surface normal, which can be represented by a P-polarization power transmission, $T_p$, an S-polarization power transmission, $T_s$, and a phase difference (or retardation) given by $\Gamma = (\phi_p - \phi_s)$.

The resulting power transmission vector is then given by $$\begin{pmatrix} |t_p|^2 \\ |t_s|^2 \end{pmatrix} = \begin{pmatrix} \left[\dfrac{\sqrt{T_p} + \sqrt{T_s}}{2}\right]^2 - \sqrt{T_p T_s}\, \sin^2 \Gamma/2 \\ \left[\dfrac{\sqrt{T_p} - \sqrt{T_s}}{2}\right]^2 + \sqrt{T_p T_s}\, \sin^2 \Gamma/2 \end{pmatrix}$$

Figure 2:
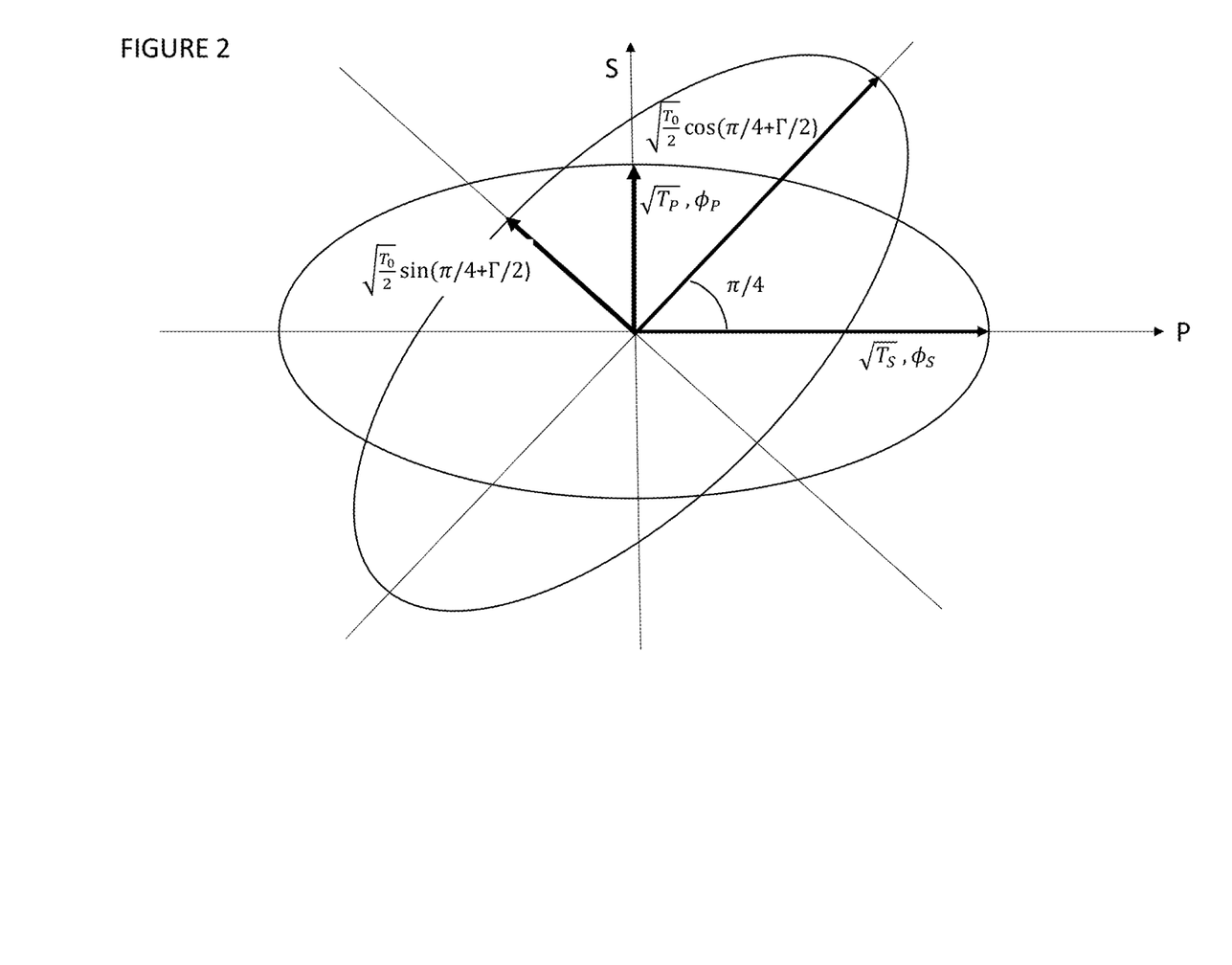
FIG. 2 shows the independent contributions of retardation and diattenuation in distorting a circular input polarization.

The first term in each vector is produced by the change in SOP due to diattenuation, which is the change in polarization introduced by a difference in transmission between P and S polarization. FIG. 2 illustrates the SOP between the tilted surface and the analyzing circular polarizer, due to the independent contribution of diattenuation and retardation. As shown, diattenuation causes a change in ellipticity of a circular input with orientation that contains the local POI. The second term in each vector is the result of a change in SOP due to retardation, or phase-difference between P and S polarization. Retardation tends to introduce ellipticity with orientation at ±45° to the POI, as shown in FIG. 2. For the example system, the leakage term ($|t_s|^2$) can be given as the superposition of each of these effects. It is important to note in this system that the orientation of the ellipse is immaterial, and that leakage depends only upon induced ellipticity.

The above vector can also be expressed as a system contrast ratio, or $$CR = \frac{|t_p|^2}{|t_s|^2}$$

In the case where the induced diattenuation and retardation are small, the contrast can be expressed by $$CR \approx \frac{1 - \left(\frac{\Delta T}{4T_o}\right)^2 - \sin^2 \Gamma/2}{\left(\frac{\Delta T}{4T_o}\right)^2 + \sin^2 \Gamma/2} \approx \frac{1}{\left(\frac{\Delta T}{4T_o}\right)^2 + (\Gamma/2)^2}$$

Where $T_p = (T_0 + \Delta T/2)$ and $T_s = (T_0 - \Delta T/2)$ and $T_0$ is the average transmission of S and P light. The above shows that retardation and diattenuation make substantially independent contributions to loss in system contrast.

A surface represents any change in (complex) refractive index, such as a slab of glass/polymer, a multi-layer coating on a substrate, an evaporated/sputtered metal, etc. For the simple case of a tilted dielectric slab in transmission, the phase difference is zero, and only diattenuation is present. Relative to normal, the difference between P and S transmission ($\Delta T$) grows with AOI up to the Brewster angle. P transmission in general increases with AOI, while S transmission declines up to the Brewster angle.

Figure 3:
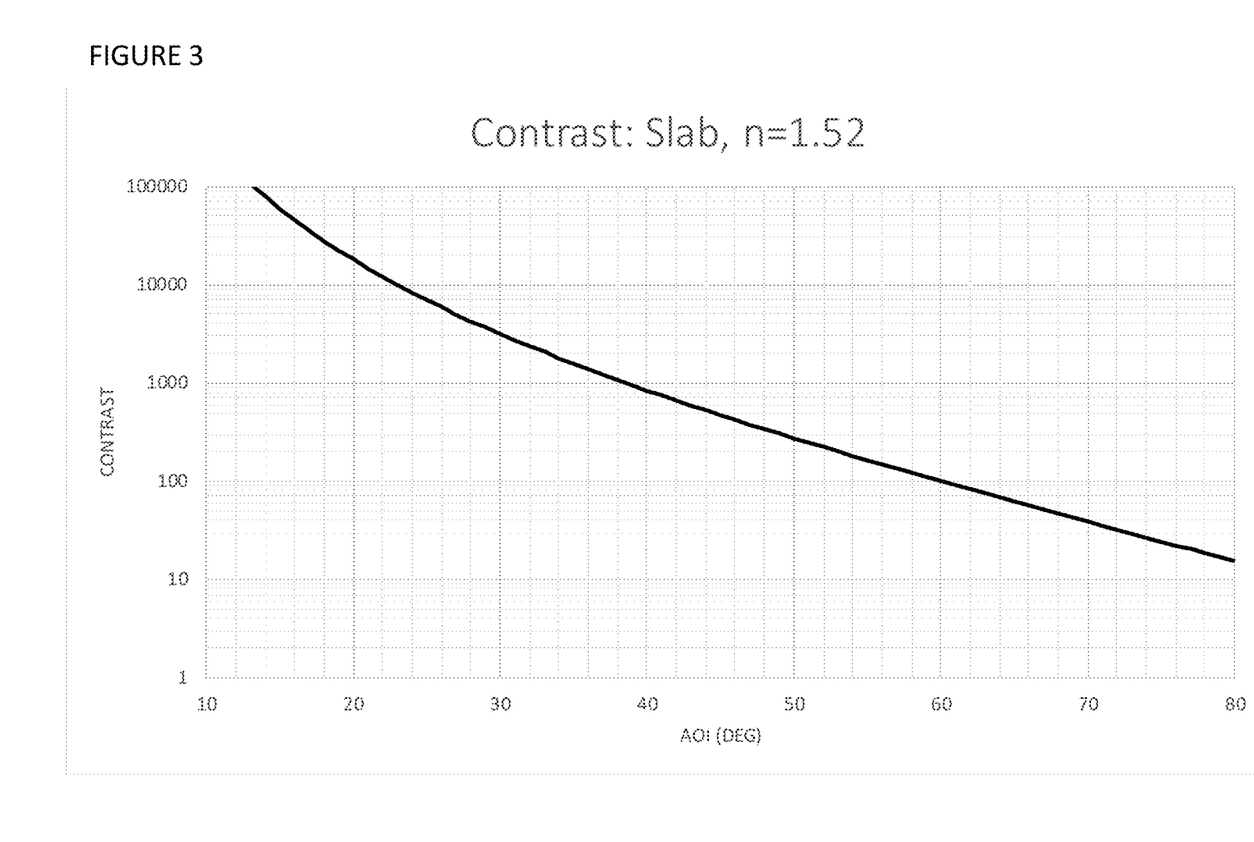
FIG. 3 shows contrast versus incidence angle for the system of FIG. 1, with the insertion of a tilted isotropic slab with a refractive index of 1.52.

FIG. 3 shows the single-pass contrast of an uncoated (e.g. glass) isotropic slab with a refractive index of 1.52 in air. In the circular polarizing system of FIG. 1, the contrast remains very high above 20°, but falls to 5,000:1 at 27°, 1,000:1 at 38°, 500:1 at 45°, 200:1 at 53°, and 100:1 at 60°. In this system, the contrast can be substantially independent of the azimuth of the POI.

The loss in contrast can become more severe when the tilted surface is a multi-layer coating and produces both diattenuation and retardation. And systems that generate large local surface normal distributions, via the source characteristics and/or the surface profile (e.g. lenses) can exacerbate the problem. For a (e.g spherical convex) lens, the local AOI contains a contribution from both the ray angle with respect to the optic-axis, as well as that from the tilt of the lens surface with respect to the optic-axis. In some systems, the tilts have azimuth independence (such as lenses aligned along a common axis), while others may have a large bias angle. For example, dichroic splitters that separate bands of wavelengths (e.g. for 3-panel RGB projection), can be highly tilted with respect to an optic axis. In either case, the disclosed techniques permit a suitable compensation for polarization distortion.

Some coatings, such as anti-reflection coatings, can improve the diattenuation by driving both P and S reflectivity to a very low value. But a multi-layer AR coating may have an increased C-plate retardation, which can represent a tradeoff. More complex multi-layer coating designs may be called for in optical systems to achieve a particular set of functional requirements. This may be to create a particular reflectivity profile over a range of wavelengths and angles. Such coatings can greatly increase the diattenuation, the retardation, or both. Generally speaking, broad-band, wide-angle coating designs that preserve the SOP in transmission/reflection have been elusive in practice. Some configurations of the disclosed techniques can be useful for decreasing both of these effects, which is useful for augmenting multi-layer design tools.

Figure 4:
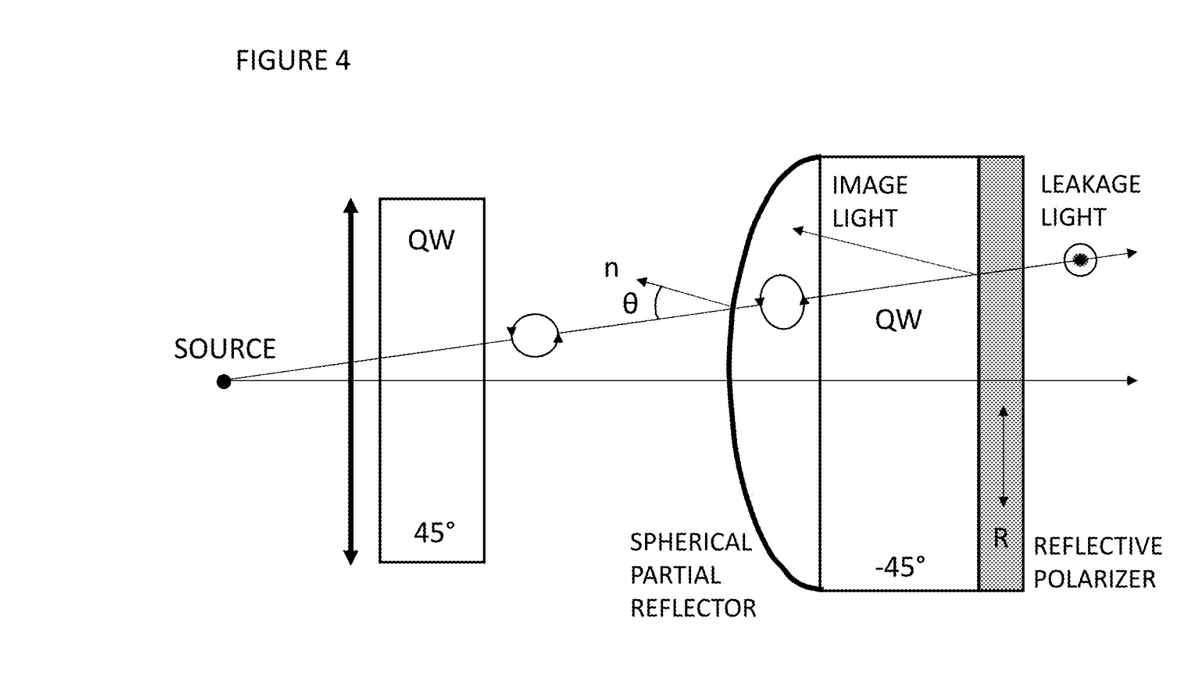
FIG. 4 shows the effect of retardation and diattenuation from a partially-reflective coating on a convex lens, as used in a polarization-based triple-pass lens.

Consider the case where a convex isotropic surface (e.g. a spherical partial reflector) is placed into FIG. 1, as illustrated in FIG. 4. Such configurations are useful in triple-pass polarization-based wide-angle lenses described in the prior art. Optimized designs are also described in co-pending application U.S. patent application Ser. No. 16/289,335, entitled "RETARDER STACK PAIRS FOR POLARIZATION BASIS VECTOR TRANSFORMATIONS", the contents of which are incorporated herein by reference. In this case, an extended source such as a display device may be in close proximity, with the associated image magnified by the lens. For near-eye systems, an observer places the eye in close proximity on the opposite side of the lens. The figure shows light that may originate from an on-axis pixel. A wide-band partial-reflector coating on the convex surface passes approximately 50% of incident circular-polarized light. This light is ideally returned to the original SOP by the second quarter-wave retarder at all wavelengths and for all incidence angles. However, rays that are not normal to the lens surface can receive a polarization distortion, and the contrast as defined above, can be reduced. In such configurations, the analyzer is a reflective polarizer that ideally returns all (image) light for an additional round-trip of the cavity. The cavity is bounded by the partial-reflector and reflective polarizer. Any light that leaks through the reflective polarizer in the first pass (due to non-zero projection of the SOP orthogonal to the reflection axis) compromises contrast. After the second pass, the partial reflector again halves the image light, which is ideally allowed to fully pass through the reflective polarizer after the third pass.

Figure 5:
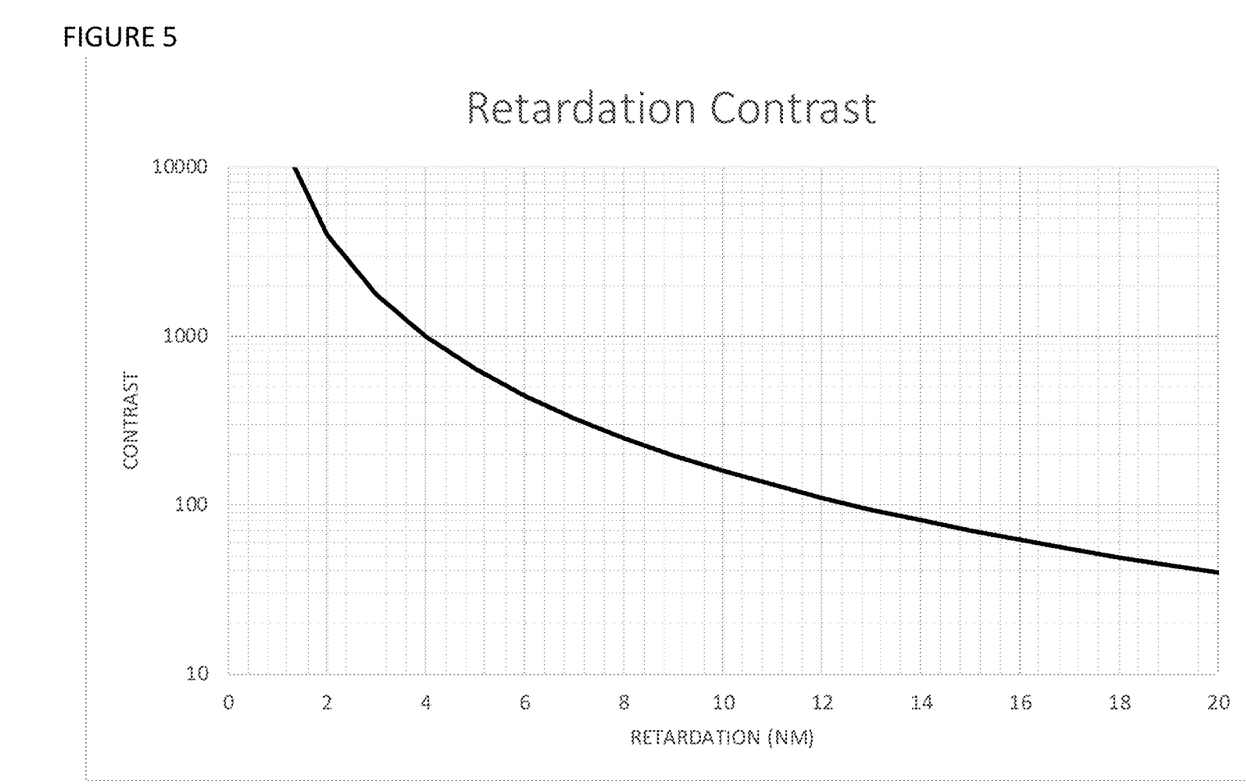
FIG. 5 shows contrast versus retardation for a polarization-based triple-pass lens, where the tilted surface produces only a retardation.

FIG. 5 shows the contrast for the lens of FIG. 4 if only retardation is introduced by the coating. This is given by the previous contrast equation (with $T_p = T_s = T_0$). This contrast is also halved to account for the loss of image light due to the second encounter with the partial reflector. The retardation contrast is therefore $$CR = \frac{1}{2} \cot^2 \Gamma/2.$$

FIG. 5 shows that 4 nm of retardation is required to drop the contrast to 1,000:1, with 13 nm producing a contrast of 100:1.

Figure 6:
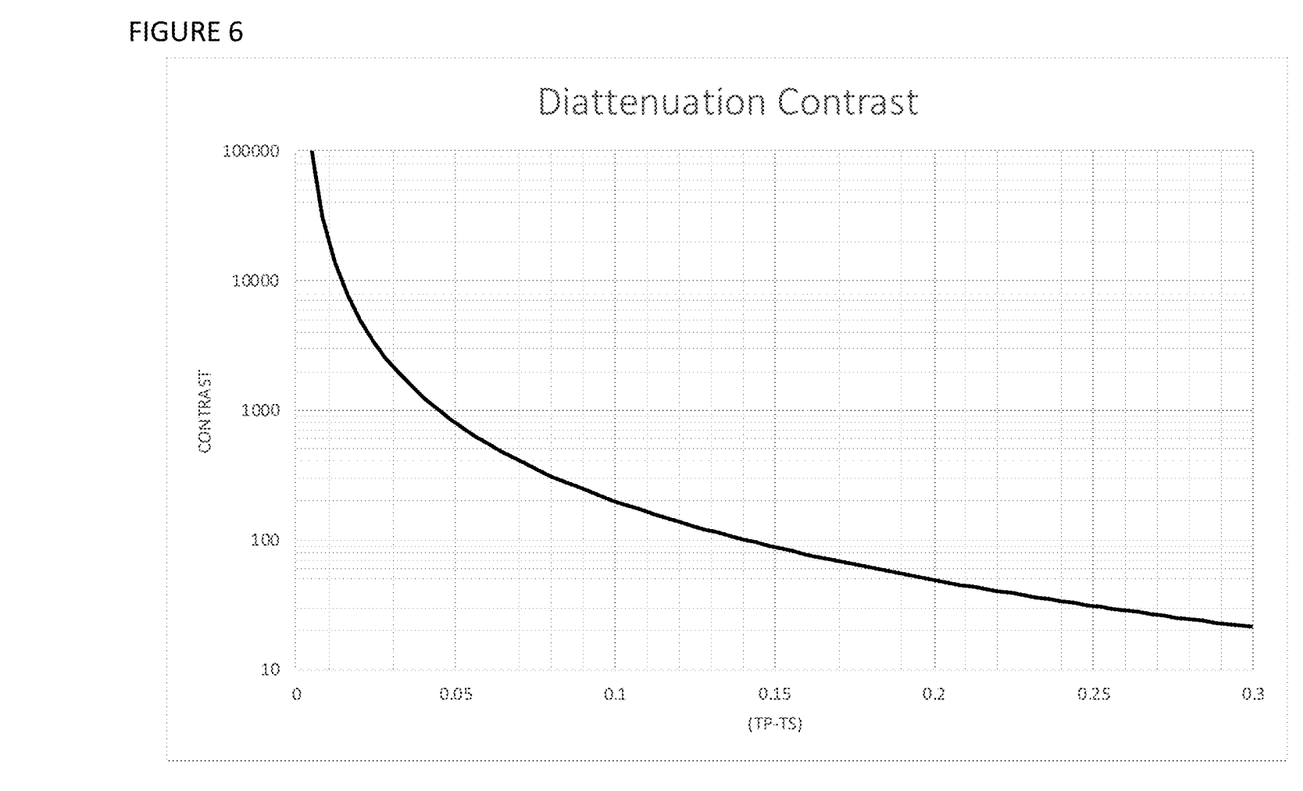
FIG. 6 shows contrast versus transmission-difference for a polarization-based triple-pass lens, where the tilted surface produces only diattenuation.

FIG. 6 shows the contrast for the lens of FIG. 4 if only diattenuation is introduced by the coating. This is given by the previous contrast equation (with $\Gamma = 0$), or $$CR = \left(\frac{\sqrt{T_p} + \sqrt{T_s}}{\sqrt{T_p} - \sqrt{T_s}}\right)^2$$

The contrast calculation assumes that the normal incidence transmission ($T_0$) is 50% and that the departure with incidence angle, $\Delta T=(T_p-T_s)$, is symmetric with respect to this. FIG. 6 shows that a difference in transmission of 4.4% is required to drop the contrast to 1,000:1, with a difference of 14% producing a contrast of 100:1.

As the contrast equation shows, the overall contrast of the lens is given by the independent superposition of power from the retardation and diattenuation contributions. In the above, a lens that produces a retardation of 4 nm and a diattenuation of 4.4% at a particular AOI thus has a contrast of 500:1, and a lens that produces a retardation of 13 nm and a diattenuation of 14% at a particular AOI has a contrast of 50:1.

In the system of FIG. 4 with a spherical partial reflector centered on axis, the change in ellipticity introduced from (e.g.) a point-source on-axis may be substantially insensitive to azimuth. This ellipticity change, due to both retardation and diattenuation of the locally tilted surface, may be zero on-axis (i.e. at normal incidence). The incidence angle on the lens includes both the ray angle and the contribution of the lens surface-normal with respect to the optic-axis. The combination can easily exceed 20°, and in high power optical systems, can exceed 30° and even 40°.

Based on this description of the AOI and azimuth dependence of the polarization distortion, a compensation scheme is proposed that has minimal impact at normal incidence, while introducing a compensating effect for both phenomena. The magnitude of compensation grows with AOI in concert with the effects of the tilted surface. To the extent that the compensation is equal and opposite to that introduced by the partial reflector, the combination can potentially nullify the ellipticity change and maintain a uniform SOP introduced to the second QW retarder. This compensator may proceed or follow the partial reflector. As discussed previously, the compensation needed differs for each effect.

A compensation structure disclosed herein can independently manage the effects of both diattenuation and retardation when azimuth-independent compensation is required. This can be done using two layers, or a single layer that compensates for both phenomena. For azimuth-independent compensation, a uniaxial retarder with optic-axis normal to the substrate (aka a C-Plate) can be used. The sign of retardation (positive or negative anisotropy) can be selected as needed to offset the retardation introduced by the coating. The retardation in the thickness-direction ($R_{th}$) is selected to nullify that introduced by the partial reflector ($\Gamma$). A second layer is a uniaxial material with an absorption axis normal to the substrate. This layer acts as a partial-polarizer with absorption axis along the optic-axis, such that minimal absorption occurs at normal incidence. This is referred to as a z-partial-polarizer (ZPP). The optical density of the ZPP is selected to reduce the transmission of P-polarized light to match that of S-polarization off-normal. When these are well-matched, the effect of diattenuation may be negligible.

The AOI dependence of the ZPP can be determined by introducing a complex refractive index into the normal surface equation (see for example Yeh, Optical Waves in Layered Media, p. 230). For a uniaxial material with optic axis normal to the substrate, the principle dielectric constants are $$\varepsilon_x=\varepsilon_y=\varepsilon_0 n_o^2,\ \varepsilon_z=\varepsilon_0 n_e^2.$$

Where $\varepsilon_0$ is the free-space dielectric constant, $n_o$ is the ordinary refractive index, and $n_e$ is the extraordinary refractive index. In the case of absorption along the z-direction only, the extraordinary refractive index is complex. For uniaxial material with weak absorption, as described in (e.g.) Born and Wolf, p. 709-711, the difference between the real part of the ordinary and extraordinary refractive indexes gives the retardation in the thickness-direction ($R_{th}$), or the C-Plate retardation. The imaginary part gives rise to an attenuation that (like the retardation) depends upon the z-component of the k-vector. The power transmission of the ZPP can be expressed as $$I=I_0 e^{-\kappa d^2\theta}$$

Where $\kappa$ is an extinction coefficient, d is the layer thickness, and $\theta$ is the AOI.

In principle, a single layer can be designed that provides the desired C-Plate compensation to correct the retardation, and the optical density can be selected to correct for the diattenuation introduced by the tilted surface. Alternatively, two layers can be stacked, one a non-absorbing C-Plate retarder, the other a ZPP. The ZPP may have a non-zero $R_{th}$, which can be offset by a suitable adjustment to the C-Plate.

Figure 7:
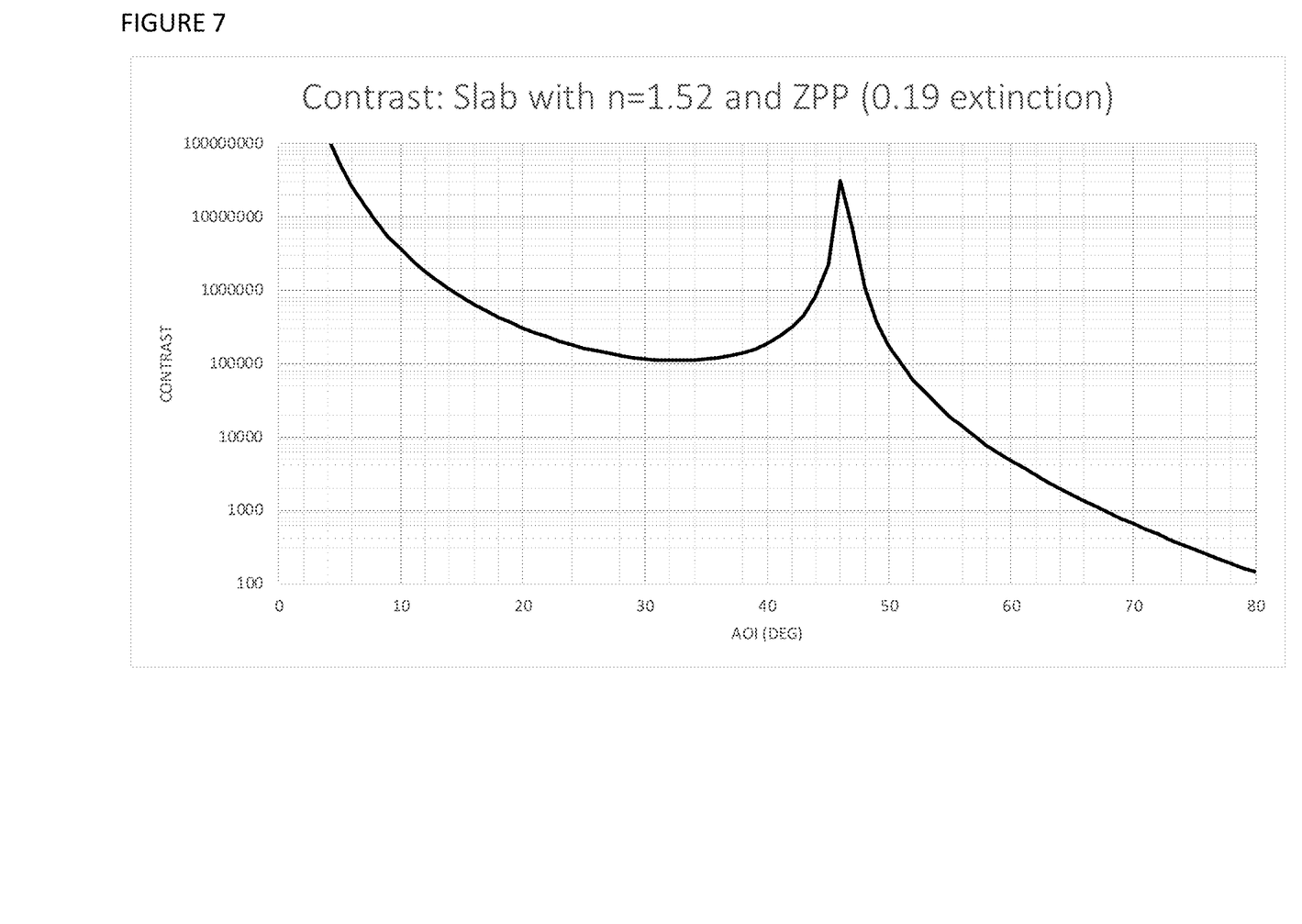
FIG. 7 shows contrast of the system of FIG. 3 with insertion of a z-partial-polarizer (ZPP) to compensate for slab diattenuation.

Returning to the example of the tilted slab which produces zero retardation, a ZPP is inserted with zero absorption in-plane and a prescribed absorption in the Z-direction. FIG. 7 shows the contrast of the tilted slab combined with the ZPP versus incidence angle. An extinction coefficient of 0.19 was selected, which gives a contrast peak at approximately 46°. A decrease (increase) in the extinction coefficient shifts the peak to a longer (shorter) incidence angle. By way of comparison, the contrast for the compensated example remains above 100k:1 out to 50° AOI, but as shown in FIG. 2, the contrast at this angle is only 274:1.

The ZPP disclosed herein can also be added to the triple-pass lens example of FIG. 4. For normal incidence, the diattenuation contrast is theoretically infinite. Off-normal, as $\Delta T$ grows, the contrast declines at a rate dependent upon the coating design and optical system design.

For a weak absorber, the exponential decay from the ZPP can be approximated as linear. Under this condition, the previous (approximated) contrast equation can be modified by adding the ZPP term to the denominator, $$CR = 8\left(\frac{T_0/\Delta T}{1-(T_0/\Delta T)\alpha\sin^2\theta}\right)^2$$

The contrast becomes infinite when the denominator vanishes at arbitrary incidence angle, $\theta_0$. Using the above, the extinction coefficient can be given by $$\alpha = \frac{\Delta T(\theta_0)}{T_0(\theta_0)\sin^2\theta_0}$$

By inserting the ZPP, the contrast can be driven to virtually infinite at a second angle ($\theta_0$) that can be selected. Inserting this, and for a smoothly varying $\Delta T(\theta)$ (as in the slab example), the contrast profile can thus be similar to that shown in FIG. 7.

Figure 8A:
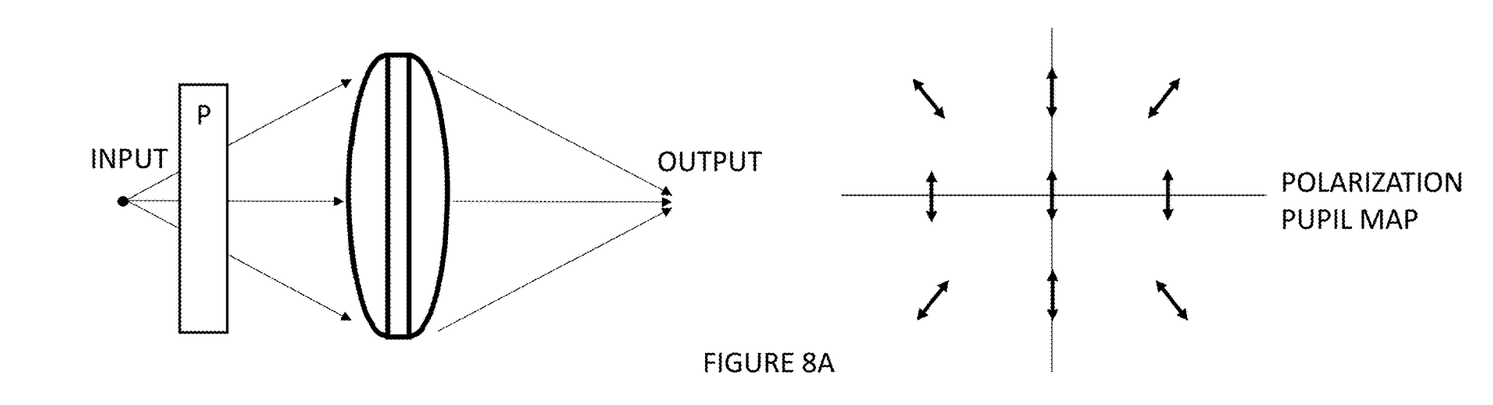
FIG. 8A shows a simple optical system containing a linearly polarized input and a lens, in which diattenuation from the lens distorts the polarization at the output.
Figure 8B:
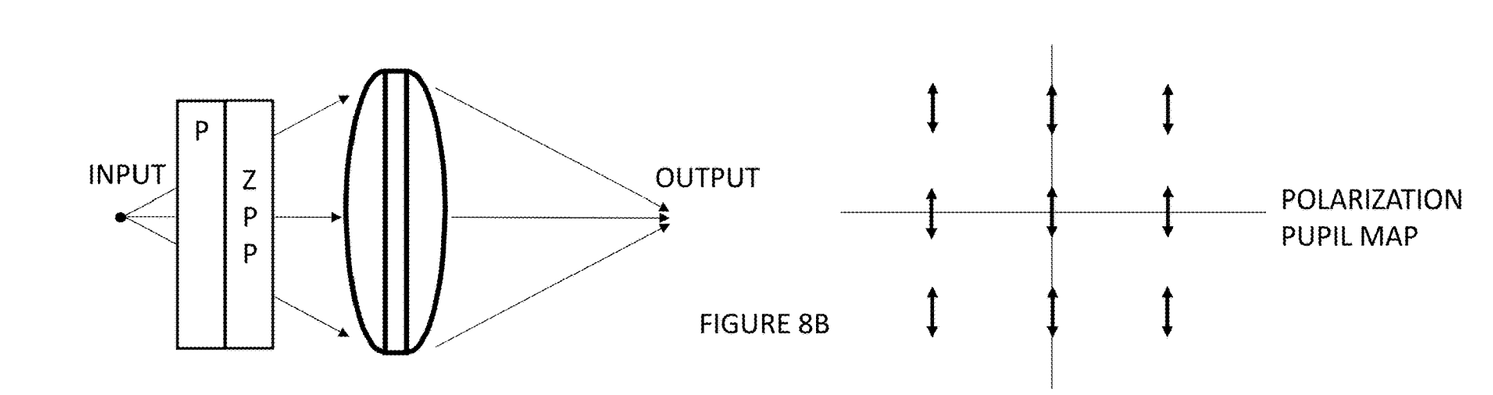
FIG. 8B shows a simple optical system containing a linearly polarized input and a lens, in which the addition of a Z-partial polarizer (ZPP) restores a uniform linear polarization.
Figure 9A:
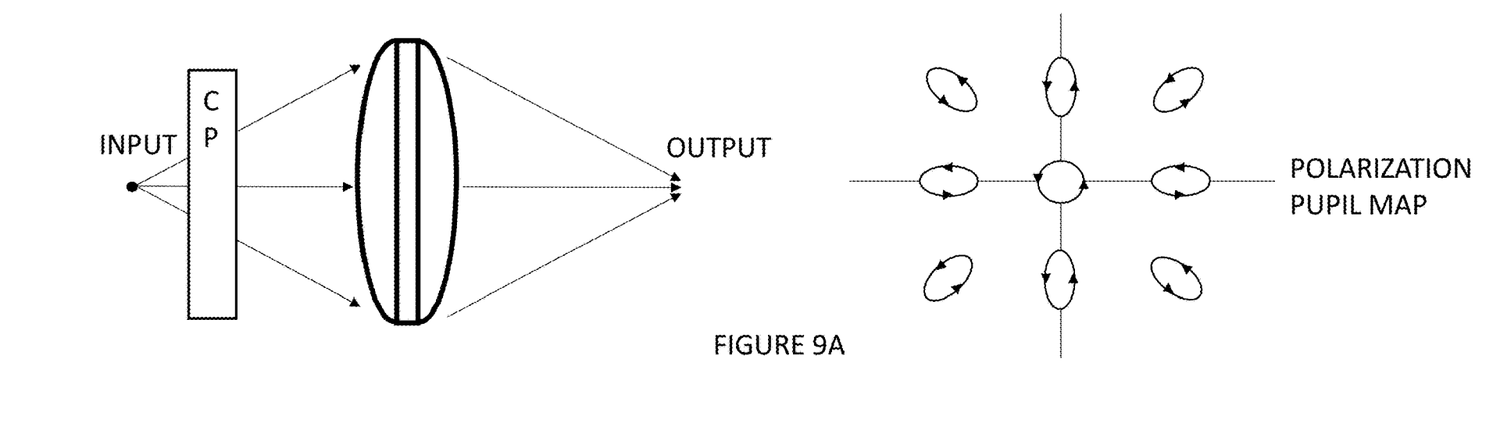
FIG. 9A shows a simple optical system containing a circularly polarized input and a lens, in which diattenuation from the lens distorts the polarization at the output.
Figure 9B:
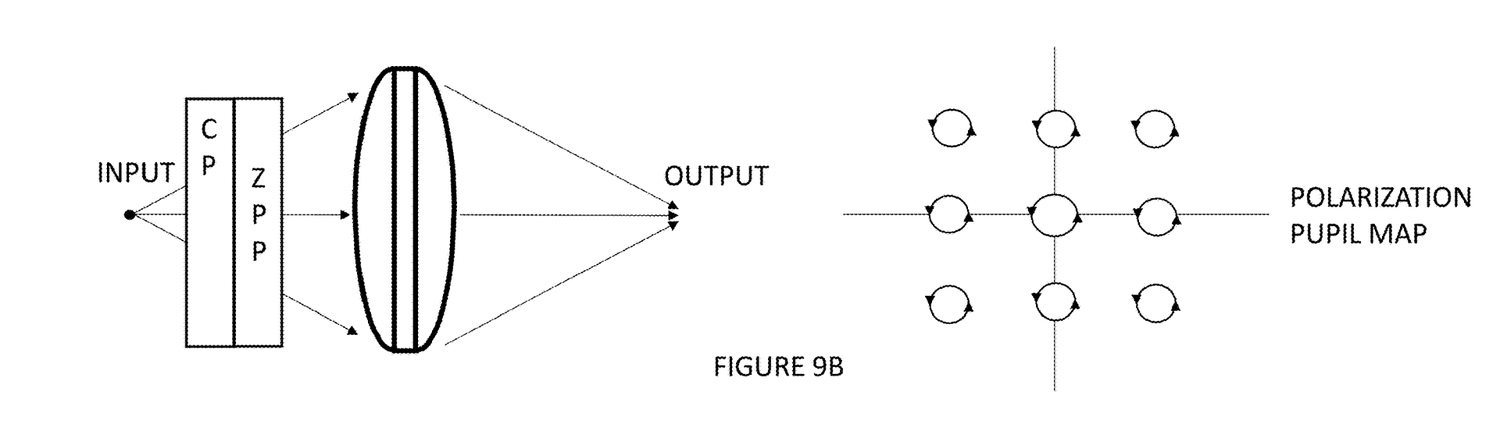
FIG. 9B shows a simple optical system containing a circularly polarized input and a lens, in which the addition of a Z-partial polarizer (ZPP) restores a uniform circular polarization.
Figure 10A:
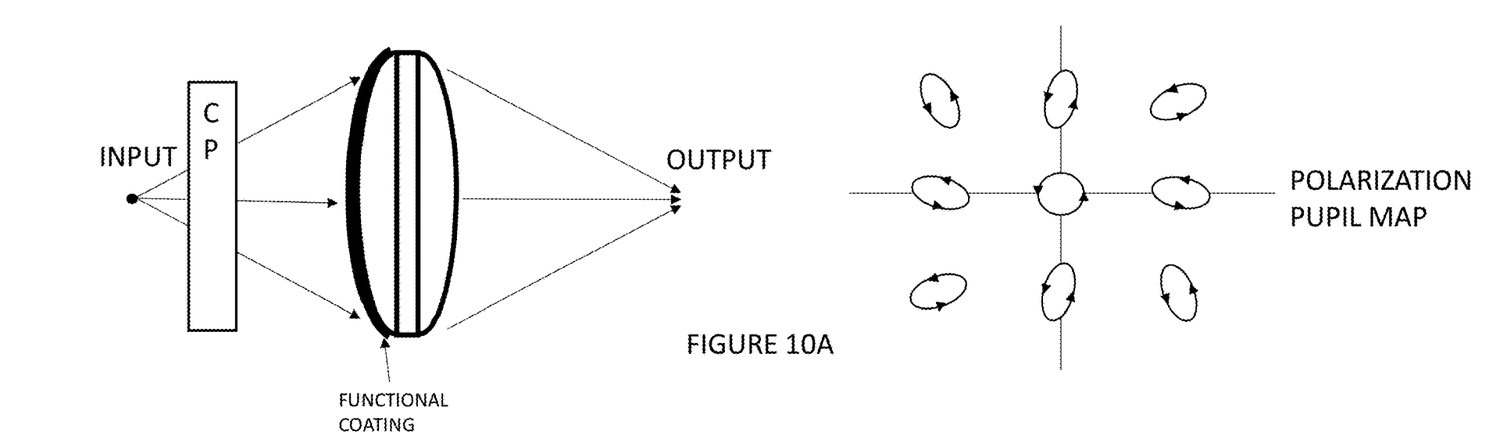
FIG. 10A shows a simple optical system containing a circularly polarized input and a coated lens with a non-zero $R_{th}$, in which diattenuation and retardation from the coated lens distort the polarization at the output.
Figure 10B:
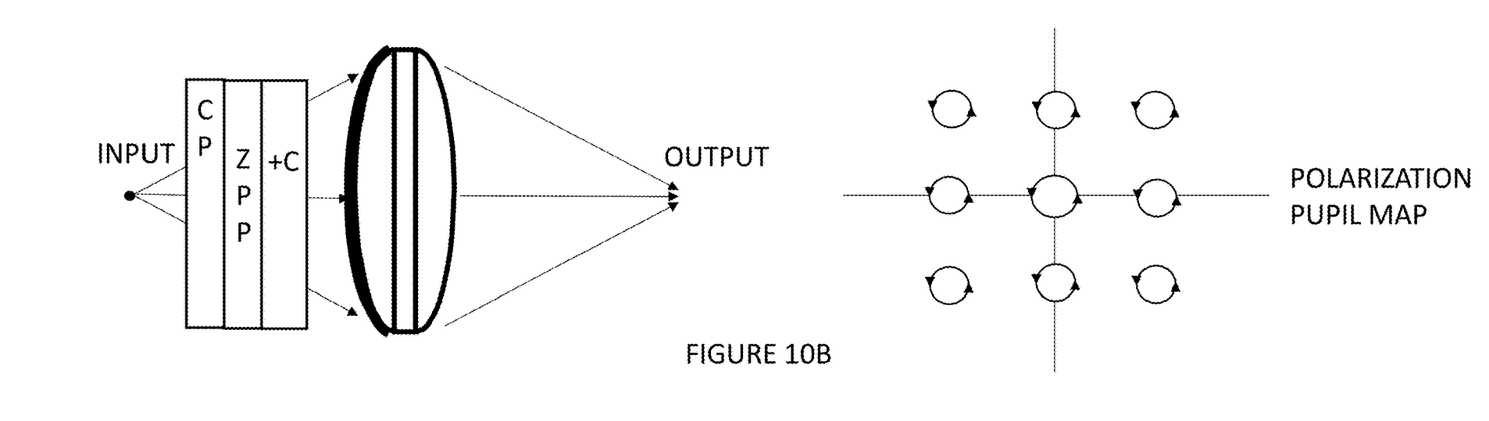
FIG. 10B shows a simple optical system containing a circularly polarized input and a coated lens with a non-zero $R_{th}$, in which the addition of a Z-partial polarizer (ZPP) and C-Plate restore a uniform circular polarization.

The invention is particularly applicable to optical systems that require or benefit from preservation of polarization. FIGS. 8-10 show simplified optical systems with a polarized input that may contain diattenuation, C-plate retardation, or both. While illustrated as a single lens, the system may include multi-element lens systems with one or more groups. It may involve reflective optics, refractive optics, or diffractive optics. Such systems may be called for (e.g.) to produce an image, relay an image, or gather light over a range of angles in high-throughput radiometric/photometric optical systems. The invention is particularly beneficial for low f-number applications where a uniform polarization is required at the output while the range of angles through the optical system is large.

FIG. 8A shows a simple optical system in which a linear polarizer is placed in the input path, followed by a lens. The lens produces diattenuation, where the transmission of local S-polarization is low relative to local P-polarization. Since the 0/90° azimuth represents an eigenpolarization, there may be no polarization distortion in these planes. However, in the ±45° azimuth, there may be approximately equal field amplitudes projected along the eigenpolarizations, and hence maximal change in polarization distortion. In this case, the distortion represents a rotation in the linear polarization. FIG. 8B shows the addition of a ZPP to the input, where the AOI-dependent absorption of local P-polarization is in approximate balance with the incremental excess loss of local S-polarization due to diattenuation. The result is a correction that restores a uniform linear polarization orientation, as shown in the exit-pupil polarization plot. In general, diattenuation is a lossy transformation, as is that of the ZPP. Thus, while a uniform polarization state may be substantially restored at the output, it can be expected that system transmission will be AOI-dependent.

FIG. 9A shows a simple optical system in which a circular polarizer is placed in the input path, followed by a lens. The lens produces diattenuation, where the transmission of local S-polarization is low relative to local P-polarization. In the case of a circular input, there may be polarization distortion for any plane-of-incidence, where the orientation of the polarization ellipse follows the POI. FIG. 9B shows the addition of a ZPP to the input, where the AOI-dependent absorption of local P-polarization is in approximate balance with the incremental excess loss of local S-polarization due to diattenuation. The result is a correction that restores a uniform circular polarization, as shown in the exit-pupil polarization plot of FIG. 9B.

FIG. 10A shows a simple optical system in which a circular polarizer is placed in the input path, followed by a lens carrying a functional coating. The lens/coating produces both diattenuation and C-plate retardation ($R_{th}$). In the case of a circular input, there may be polarization distortion for any plane-of-incidence, where the orientation of the polarization ellipse again follows the POI. FIG. 10B shows the addition of a ZPP and a C-plate retarder to the input. The AOI-dependent absorption of local P-polarization and $R_{th}$ retardation values are in approximate balance with the incremental excess loss of local S-polarization due to diattenuation and the $R_{th}$ value of the coating, respectively. The result is a correction that restores a uniform circular polarization, as shown in the exit-pupil polarization plot of FIG. 10B.

The ZPP can be constructed using any anisotropic material that appropriately depletes the transmission of P-polarization more than the S-Polarization off-normal; to reduce the diattenuation effects on the SOP. Naturally occurring crystals (e.g. tourmaline) exist, though it is preferable that the ordinary transmission is maximized for throughput reasons. Also, crystals tend not to be as practical for cost and scalability reasons. Alternatively, the ZPP can be made using (e.g.) nano-technology (see for example product from Nano-Photon), or by orienting long-chain molecules in the thickness direction, much like the fabrication of typical sheet polarizers. A guest-host liquid-crystal could also be used to homeotropically orient an absorbing material, which is then cross-linked (e.g. reactive mesogen LC). The concentration of the dye and layer thickness determine the strength of the absorption. In the case of guest-host, it is possible for the layer to appropriately compensate both retardation and diattenuation.

The physical mechanism for implementing the ZPP need not be absorption, and can be any mechanism that appropriately depletes the transmission of P-polarization, including reflection and diffraction. In the case of reflection, so-called "Giant Birefringent Optics" ((GBO) as described in literature by 3M) and associated design freedom can be used to synthesize reflection/transmission characteristics that may not be feasible with typical thin-film coatings. In this context, a GBO component may balance the transmission of local S and P polarizations, thus producing a desired functionality while preserving polarization. For instance, a thermoformed GBO partial reflector that functions as an isotropic 50:50 coating, exhibiting zero $R_{th}$ and balance of S and P transmission could be an ideal optical component for implementing a triple-pass lens as described previously.

Figure 11:
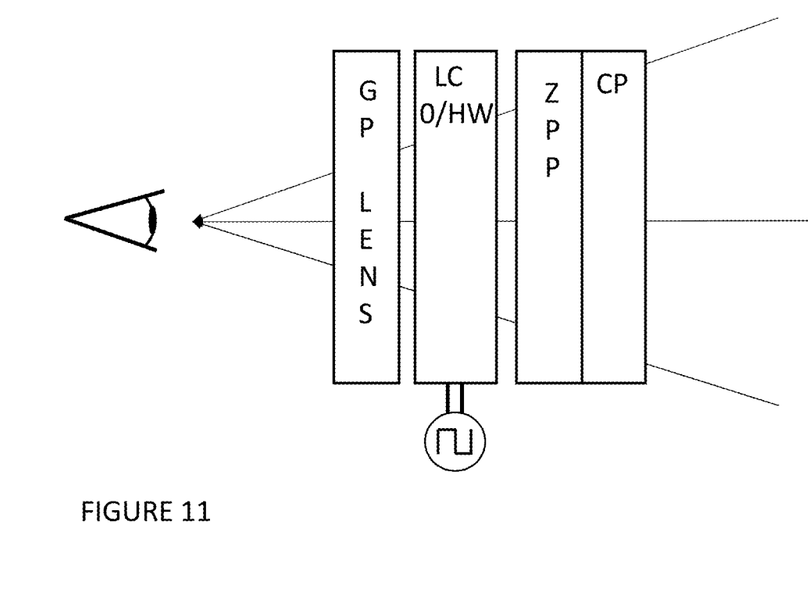
FIG. 11 shows a device using a ZPP to optimize the SOP for a geometric-phase switchable focal-length lens.

Systems that require polarization management are not uncommon, particularly in imaging. The wide-angle collimators discussed previously require careful (circular) polarization management over wavelength and angle to minimize stray light and ghosts. Circular polarizers are also used in conjunction with polarization optics having circular eigenstates, such as cholesteric liquid crystals and geometric-phase diffractive optical elements (e.g. lenses and beam-directors). Circular polarizers are also used in double-pass polarization isolators, where the degree of isolation depends upon the ellipticity at the specular reflection surface over a range of incidence angles. These may be passive or active systems, such as liquid crystal switchable focal-lengths as needed in AR/VR applications. FIG. 11 shows a viewer observing a scene through a switchable focal-length lens. An input circular polarizer (CP) provides an input SOP. An LC device that can switch between an isotropic SOP and a half-wave retardation SOP can switch the handedness of the circular state, or leave it unchanged. A geometric-phase lens structure can provide one optical power encoded in left-hand circular SOP and another power encoded in right-hand circular SOP. Switching the LC device can thus change a focus distance for a viewer. A ZPP (possibly with additional C-plate retardation) can correct the polarization such that a uniform circular SOP is incident on the GP lens structure over a wide range of angles. By providing a uniform polarization state over the pupil map, focal-length switching can be accomplished with minimal cross-talk.

Polarization is used in stereoscopic 3D projection systems, microscopy, and general polarimetric/polarization imaging. Polarization can be information bearing in imaging applications used in computer vision (e.g. object classification), medical diagnostics, biological-research, and military detection/surveillance. Polarization can also be used in non-imaging applications such as high-throughput radiometry/photometry. The principles of the invention can be applied to a wide range of the electromagnetic spectrum, including UV, visible, near-infrared, and infrared.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

What is claimed is:

1. An optical component comprising an anisotropic material with an optic-axis substantially normal to the substrate, a thickness-direction retardation ($R_{th}$), and a thickness-direction absorption;
   wherein the transmission of p-polarized light is less than the transmission of s-polarized light and wherein the optical component produces a phase-difference between transmitted p-polarized light and transmitted s-polarized light.

2. An optical component as defined in claim 1, wherein the absorption of light at normal incidence is <5%.

3. An optical component as defined in claim 1, wherein the absorption of light at normal incidence is <2%.

4. An optical component as defined in claim 1, wherein the transmission of p-polarized light declines according to the exponential decay function, $I=I_0 e^{-\kappa d^2 \theta}$.

5. An optical component as defined in claim 4, wherein an extinction-coefficient and thickness of the optical component are selected to produce a specific non-zero transmission of p-polarized light at a prescribed angle-of-incidence.

6. An optical component as defined in claim 1, further including a non-absorbing anisotropic material with an optic-axis normal to the substrate and a second thickness-direction retardation, wherein the combined angle-dependent absorption and $R_{th}$ can be selected independently.

7. An optical component as defined in claim 1, wherein the optical component comprises a cross-linked reactive mesogen.

8. An optical component as defined in claim 1, wherein the optical component comprises a homeotropically aligned liquid crystal.

9. An optical component as defined in claim 1, wherein the optical component comprises a guest-host liquid-crystal with an oriented absorbing dye.

10. An optical component as defined in claim 1, wherein the optical component comprises an oriented nano-structure.

11. A compensator for use in a polarization-preserving optical-system, comprising an anisotropic material with an optic-axis substantially normal to the substrate, a thickness-direction retardation ($R_{th}$), and a thickness-direction absorption, wherein the addition of the compensator substantially increases system contrast or uniformity of a polarization pupil map;
   wherein the transmission of p-polarized light is less than the transmission of s-polarized light and wherein the compensator produces a phase-difference between transmitted p-polarized light and transmitted s-polarized light.

12. A compensator as defined in claim 11, wherein the absorption of light at normal incidence is <5%.

13. A compensator as defined in claim 11, wherein the absorption of light at normal incidence is <2%.

14. A compensator as defined in claim 11, wherein the transmission of p-polarized light declines according to the exponential decay function, $I=I_0 e^{-\kappa d^2 \theta}$.

15. A compensator as defined in claim 14, wherein the compensator extinction-coefficient and thickness are selected to produce a specific non-zero transmission of p-polarized light at a prescribed angle-of-incidence.

16. A compensator as defined in claim 11, further including a non-absorbing anisotropic material with an optic-axis normal to the substrate and a second thickness-direction retardation, wherein the combined angle-dependent absorption and $R_{th}$ can be selected independently.

17. A compensator as defined in claim 11, wherein the compensator comprises a cross-linked reactive mesogen.

18. A compensator as defined in claim 11, wherein the compensator comprises a homeotropically aligned liquid crystal.

19. A compensator as defined in claim 11, wherein the compensator comprises a guest-host liquid-crystal with an oriented absorbing dye.

20. A compensator as defined in claim 11, wherein the compensator comprises an oriented nano-structure.

21. An optical system comprising an input polarized light, a lens that produces diattenuation in transmission, and a Z-Partial-Polarizer (ZPP), wherein the ZPP transmits p-polarized light less than s-polarized light in a manner that substantially reduces the polarization distortion produced by diattenuation.

22. An optical system as defined in claim 21, wherein, for a prescribed incidence-angle, the system transmits p-polarized light and s-polarized light equivalently.

23. An optical system as defined in claim 21, wherein the prescribed incidence-angle is between 30° and 60°.

24. An optical system as defined in claim 21, wherein the ZPP is located in a position of either a converging or diverging cone of light.

25. An optical system as defined in claim 21, further including a functional coating with a thickness-direction retardation ($R_{th}$) and a C-plate co-located with the ZPP that substantially reduces the net $R_{th}$.

26. An optical system as defined in claim 21, further including a functional coating with a thickness-direction retardation ($R_{th}$) and a ZPP with a thickness-direction retardation such that the net thickness direction retardation is substantially reduced.

27. An optical component comprising an anisotropic material with an optic-axis substantially normal to the substrate, a thickness-direction retardation ($R_{th}$), and a thickness-direction absorption;
   wherein the transmission of p-polarized light declines according to the exponential decay function, $I=I_0 e^{-\kappa d \sin^2 \theta}$; and
   wherein an extinction-coefficient and a thickness of the optical component are selected to produce a specific non-zero transmission of p-polarized light at a prescribed angle-of-incidence.

* * * * *